United States Patent [19]

Mogamiya

[11] Patent Number: 5,406,413
[45] Date of Patent: Apr. 11, 1995

[54] LENS COVER APPARATUS OF OPTICAL INSTRUMENT

[75] Inventor: Makoto Mogamiya, Tokyo, Japan

[73] Assignee: Asahi Kogaku Kogyo Kabushiki Kaisha, Tokyo, Japan

[21] Appl. No.: 921,099

[22] Filed: Jul. 29, 1992

[30] Foreign Application Priority Data

Jul. 30, 1991 [JP] Japan ................................ 3-214774
Jul. 30, 1991 [JP] Japan ................................ 3-214775

[51] Int. Cl.6 ................. G03B 11/04; G03B 17/02
[52] U.S. Cl. ........................... 359/511; 359/507; 354/288
[58] Field of Search ..................... 359/507–511; 15/250.001–250.003, 250.01–250.09; 354/286, 288

[56] References Cited

U.S. PATENT DOCUMENTS 2,583,228 1/1952 Numbers ..................... 359/511
4,363,545 12/1982 Schaefer et al. ............... 359/507
4,522,478 6/1985 Kando et al. .................. 354/288

FOREIGN PATENT DOCUMENTS 256573 5/1988 Germany .
310548 12/1990 Japan ............................ 359/511
3-235930 10/1991 Japan .
1138451 1/1969 United Kingdom .

OTHER PUBLICATIONS

English Abstract of Japanese Patent No. 3-235930.

Primary Examiner—Loha Ben
Assistant Examiner—Thong Nguyen
Attorney, Agent, or Firm—Sandler, Greenblum & Bernstein

[57] ABSTRACT

A lens cover apparatus of an optical instrument having a lens including a lens cover for covering the lens of the optical instrument, and a lens cleaning member provided on the lens cover opposite the lens.

18 Claims, 10 Drawing Sheets

LENS COVER APPARATUS OF OPTICAL INSTRUMENT

BACKGROUND OF THE INVENTION

1. Field of the Invention

The present invention relates to a lens cover apparatus of an optical instrument. More precisely, it relates to a lens cover apparatus having a lens cleaning function.

2. Description of Related Art

As the front surface of a lens in an optical instrument, such as a still camera, movie camera, telescope or binocular telescope is exposed when the instrument is in use, foreign matter, such as dust, water, or fingerprints are likely to come into contact with the lens. To remove the dust, etc. from the lens surface, a photographer typically cleans the lens manually by using a lens cleaner. However, in the absence of a lens cleaner, the photographer will often use a substitute, such as handkerchief or tissue paper, etc. However, this is not preferable, since dust cannot be completely removed and the lens surface is likely to be damaged.

SUMMARY OF THE INVENTION

The primary object of the present invention is to provide a lens cover apparatus which is mounted to a lens of an optical instrument and which serves as a lens cleaner.

Note that the lens cover apparatus referred to in the present invention includes not only a detachable type, in which a lens cap can be detachably mounted to the associated optical instrument, but also an integral type, in which a lens cover provided on the associated optical instrument is opened and closed.

According to the present invention, a lens cover, which is detachably attached to the front end of an optical instrument to cover a lens of the optical system, is provided with a lens cleaning member on the surface thereof opposite the lens.

Preferably, the lens cleaning member is linearly movable into and out of contact with the lens and is continuously biased away from the lens.

Preferably, the lens cleaning member is made to rotate when actuated.

According to another aspect of the present invention, a lens cover apparatus comprises a lens barrier which is provided on the front end of an associated optical instrument to be opened and closed and further comprises a lens cleaning member provided on the surface thereof opposite the lens.

The present disclosure relates to subject matter contained in Japanese patent applications No.3-214774 (filed on Jul. 30, 1991) and No.3-214775 (filed on Jul. 30, 1991) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 1:
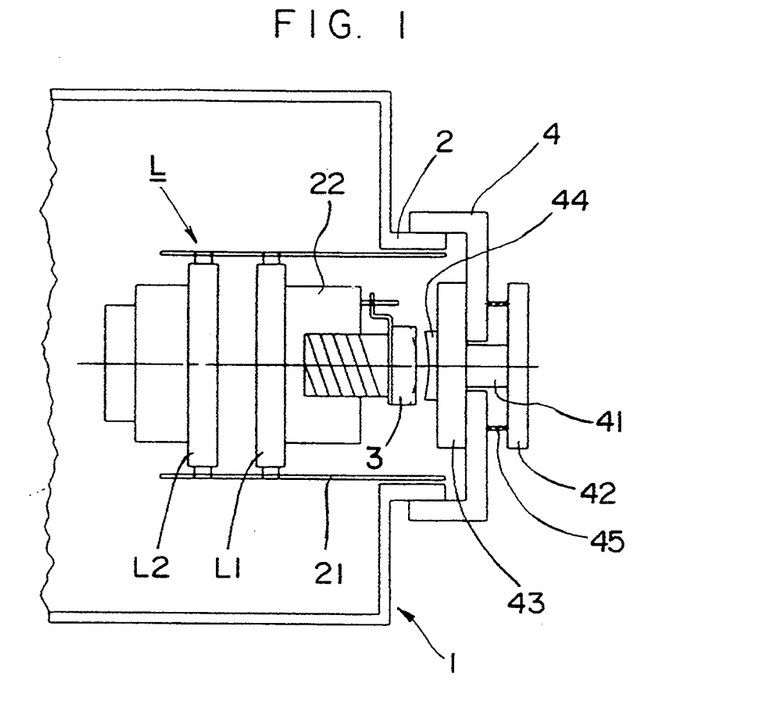
FIG. 1 is a side sectional view of a lens cap mounted to a camera, according to a first embodiment of the present invention.
Figure 2:
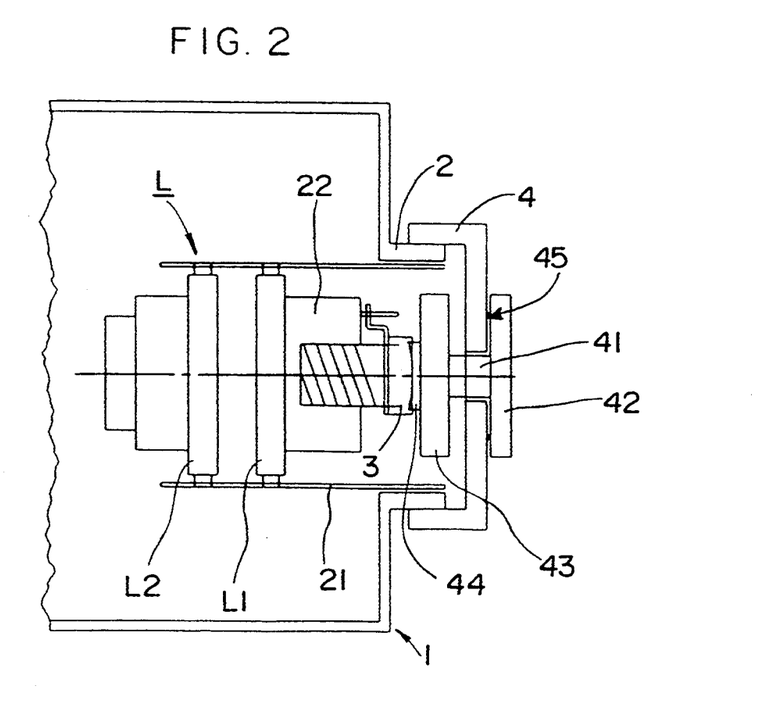
FIG. 2 is a side sectional view of a lens cap shown in a state different from FIG. 1.
Figure 3:
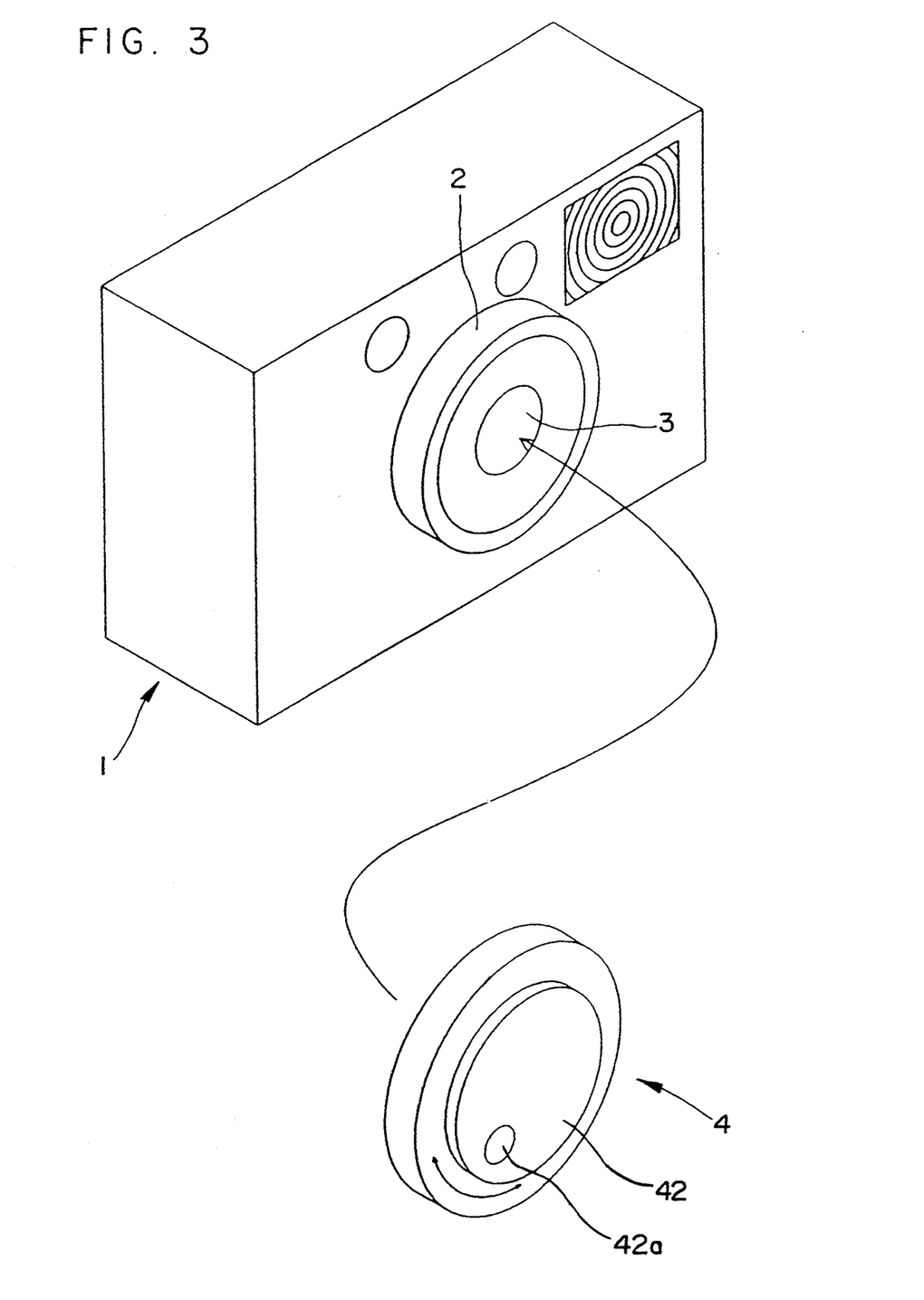
FIG. 3 is a perspective view of a lens cap detached from a camera shown in FIG. 1.

FIGS. 1 through 3 show an embodiment of the present invention applied to a lens cap which is detachably attached to an optical instrument and which is provided with a lens cleaning member.

Camera 1 has a lens barrel 2 which has therein a focusing lens 3 at a central portion thereof. The lens 3 is exposed at the front end of the lens barrel 2. A lens cap 4 is detachably mounted to the lens barrel 2 to cover the front surface of lens 3.

The internal construction of the lens barrel 2 will be discussed below with reference to FIGS. 1 and 2. A lens system L, including a variable power lens groups L1 and L2, and a cam ring 21 which moves the lens system L, are provided in the lens barrel 2. A lens frame which supports the variable lens group L1 holds a shutter unit 22, so that the focusing lens 3 is rotated by a stepping motor within the shutter unit 22. The focusing lens 3 is located at the frontmost position of the lens system L.

Lens cap 4 is provided at the center portion thereof with a shaft 41 which extends therethrough in the optical axis direction of the lens system L. The central shaft 41 is rotatable and slidable with respect to the lens cap 4. The central shaft 41 is longer than the thickness of the lens cap 4.

Central shaft 41 is provided on the front end thereof, which projects out from the lens cap 4, with a circular operation plate 42. Operation plate 42 has an eccentric recess 42a, as shown in FIG. 3. The central shaft 41 is provided, on the opposite end (rear end) thereof inside the lens cap 4, with a rotatable plate 43. A cleaning member 44 is provided on the side of rotatable plate 43 opposite the focusing lens 3 to clean the focusing lens 3.

Lens cleaning member 44 is made of, for example, a soft deformable material having a lens cleaning function, such as felt. The surface of the lens cleaning member 44 adjacent to the focusing lens 3 is concave corresponding to the convex focusing lens 3, as shown in FIGS. 1 and 2.

As can be seen in FIG. 1, a spring 45 is provided between the lens cap 4 and the operation plate 42 to continuously bias the central shaft 41 toward the outside of the lens cap 4.

The operation of the lens cap apparatus of an optical instrument, as constructed above, is as follows.

If the power source of the camera 1 is turned OFF, the focusing lens 3 will be located at the infinite photographic position, i.e., at the retracted position closest to the front lens group L1.

In this state, if the lens cap 4 is mounted to the lens barrel 2, the central shaft 41 is biased by the spring 45 toward the outside of the lens cap 4, as mentioned above. Accordingly, the operation plate 42, the rotatable plate 43, and the cleaning member 44 are located in a fowardmost position furthest from the focusing lens 3.

When a photographer depresses the recessed area 42a of the operation plate 42, the central shaft 41, operation plate 42, rotatable plate 43 and cleaning member 44 are moved inwardly toward the focusing lens 3 against the bias of spring 45. As a result, the concave surface of the lens cleaning member 44 comes into contact with the front lens surface of the focusing lens 3, as shown in FIG. 2.

Thereafter, if the photographer manually rotates the operation plate 42 to rotate the lens cleaning member 44, which is in contact with the lens surface of the focusing lens 3, dust or other foreign matter (i.e., fingerprints, water vapor, etc.) which have come into contact with the lens surface is removed by the cleaning member 44.

Figure 4:
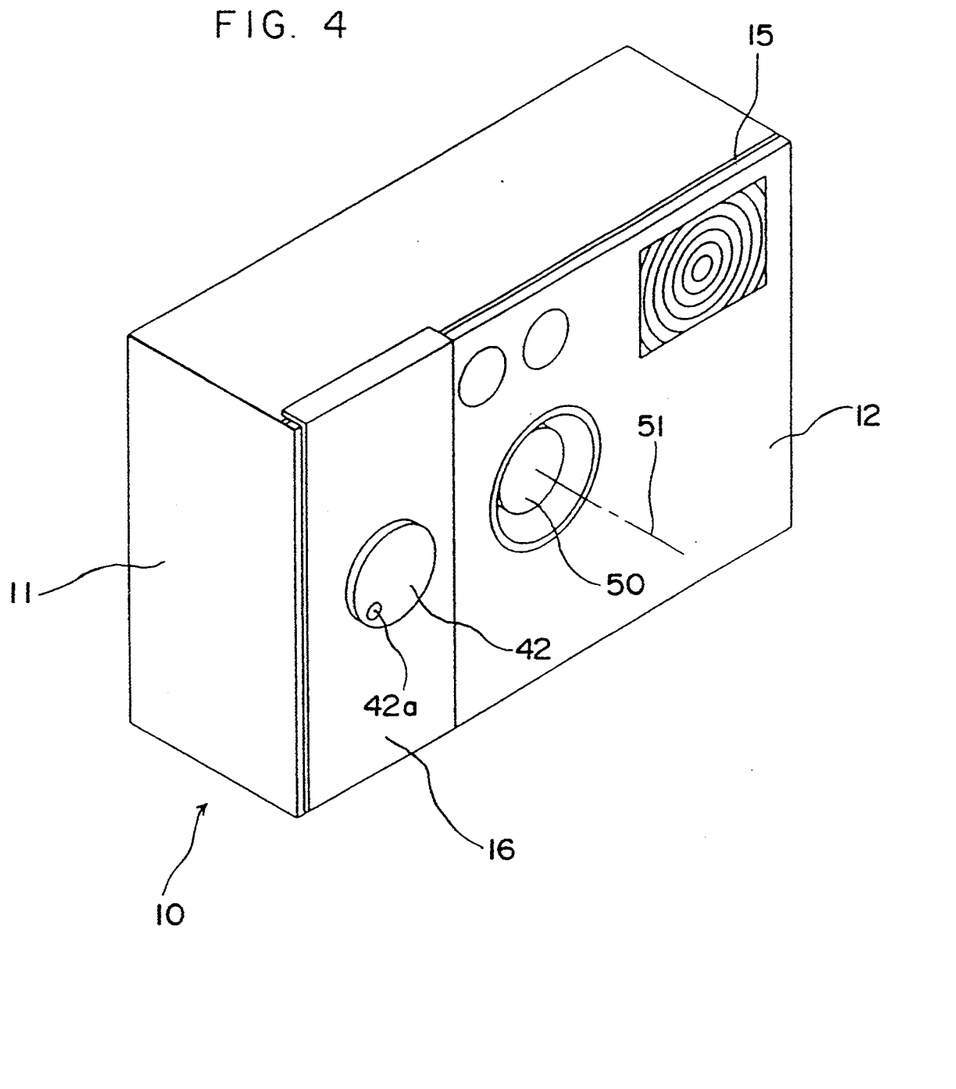
FIG. 4 is a perspective view of a lens cover apparatus according to a second embodiment of the present invention.

In the above-mentioned embodiment, the shaft 41, operation plate 42, rotatable plate 43, cleaning member 44, and spring 45 are provided on the lens cap 4, which is detachably mounted to the camera 1. Alternatively, in a second embodiment of the present invention, it is possible to provide these elements on a slidable lens cover 16, as shown in FIG. 4. Namely, in the modified embodiment shown in FIG. 4, the shaft 41, operation plate 42, rotatable plate 43, cleaning member 44, and spring 45 are provided on the slidable lens cover 16 which is mounted to a body 11 of a camera 10 so as to slide in a direction perpendicular to the optical axis 51 of the lens 50 along upper and lower guide grooves 15 formed on the camera body 11.

Furthermore, although the cleaning member 44 is rotatable with respect to the lens cap 4 in the first embodiment shown in FIGS. 1 and 2, it is possible to make the lens cleaning member 44 integral with the lens cap 4 (i.e., not rotatable with respect to the lens cap 4). In this alternative, the lens cap 4 itself is rotatably mounted to the lens barrel 2, so that when the lens cap 4 is rotated relative to the lens barrel 2, the cleaning member 44 rubs against the lens surface to clean the same.

In the embodiments illustrated in FIGS. 1 through 3 and FIG. 4, the lens cleaning member 44 is linearly movable into and out of contact with the focusing lens 3 or 50 and is continuously biased away from the lens by the spring 45, so that when the operation plate 42 is depressed by a photographer, the cleaning member 44 is brought into contact or forceable-contact with the lens surface, as mentioned above. However, the present invention is not limited to this arrangement. Namely, for instance, it is possible to make the cleaning member 44 immovable in the direction towards or away from the focusing lens 3 or 50, such that the cleaning member 44 automatically comes into contact with the lens surface when the lens cap 4 is mounted to the lens barrel 2 or the lens cover 16 is slidably moved to a position in which the rotatable plate 43 is opposed to the lens 50.

In addition, it is also possible to manually clean the lens surface of the lens 3, which has been brought into the frontmost position (projected position), with the cleaning member 44 without mounting the lens cap 4 to the lens barrel 2.

If the front face 12 of the body 11 of the camera 10 is flush with the lens surface of the lens 50 in FIG. 4, the cleaning member 44 can be immovably provided on the lens cover 16, so that when the lens cover 16 slides along the guide grooves 15, the cleaning member 44 rubs against the lens surface to clean the same.

Although the above discussion has been directed to a camera, as an example of the optical instrument, the invention can be applied to, for example, a video camera, telescope, binocular telescope, etc.

The word "lens" used in the present specification refers to not only a lens having a curved lens surface, but also a plane lens or surface, such as a glass plate for protecting a filter or a lens.

FIGS. 5 through 11 show another embodiment of the present invention, in which a lens cleaning member is provided on a lens barrier. Camera 1 contains therein the variable power lens groups L1 and L2, cam ring 21, and shutter unit 22, similar to the first embodiment shown in FIGS. 1 and 2. The front lens housing 13 is supported on the lens frame which supports thereon the front lens group L1.

Shutter unit 22 has a drive pin 52 which is rotated about the optical axis by the stepping motor to effect the focusing operation. The drive pin 52 is engaged by an association arm 62 which projects in the radial direction from a helicoid ring 61. The helicoid ring 61 supports the focusing lens 3 and is screw-engaged by the shutter unit 22. When the drive pin 52 is rotated about the optical axis in accordance with the object distance data, the helicoid ring 61 and, accordingly, the focusing lens 3 are rotated and moved in the optical axis direction to effect the focusing operation. The focusing lens 3 is opposite to a lens window 31 of the front lens housing 13.

Front lens housing 13 is provided therein with a lens barrier 7A which opens and closes the lens window 31. The lens barrier 7A is comprised of a pair of upper and lower semicircular barrier plates 7, as shown in FIG. 11. The barrier plates 7 are pivoted about the front lens housing 13 or the shutter unit 22 through pivot shafts 71, so that when a barrier actuating switch (not shown) which is provided, for example, on the camera 1 is actuated, the barrier plates are opened and closed, as shown in FIGS. 10 and 11.

Semicircular lens cleaning members 8 are secured to the back side of the barrier plates 7 adjacent to the focusing lens 3. The lens cleaning elements 8 are preferably made of a soft deformable material, such as felt. The cleaning elements 8 are concave on the face thereof adjacent to the focusing lens 3, corresponding to the convex lens surface.

Figure 10:
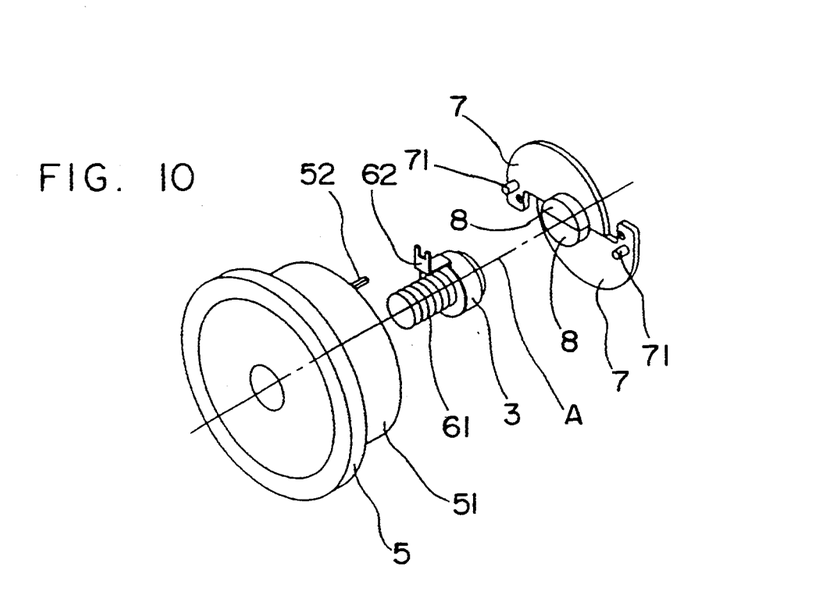
FIG. 10 is an exploded perspective view of a main part of a lens cover apparatus shown in a closed position, according to a third embodiment of the present invention.
Figure 11:
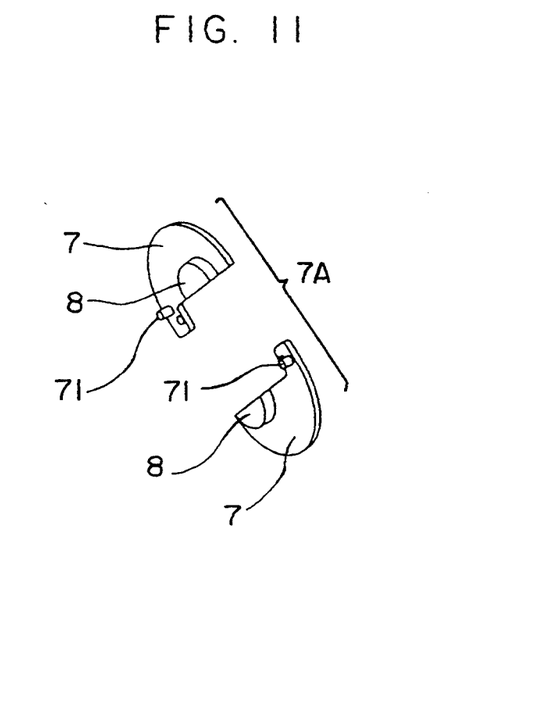
FIG. 11 is a perspective view of a barrier plate in an open position.

When the barrier plates 7 are closed, as shown in FIG. 10, the cleaning elements 8 are interconnected to define a circular cleaning member corresponding to the focusing lens 3. In this state, the circular cleaning member has a center located on the optical axis A of the focusing lens 3 and the barrier plates 7 close the lens window 31 of the front lens housing 13.

Figure 7:
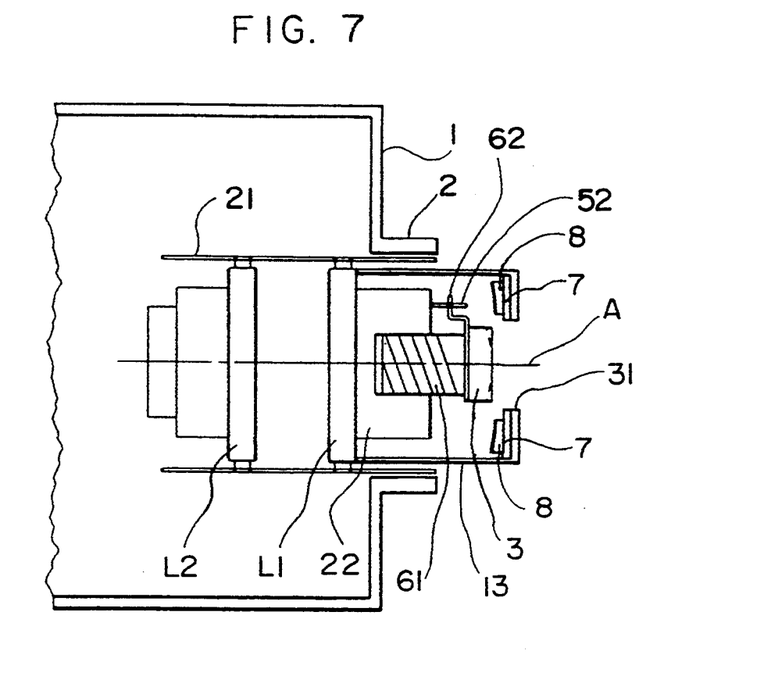
FIG. 7 is a side sectional view of a lens cover of a camera shown in an open position, according to a third embodiment of the present invention.

When the barrier plates 7 are opened, as shown in FIG. 11, the cleaning members (halves) 8 are retracted from the optical axis A, away from the front surface of the focusing lens 3, as shown in FIG. 7, and the barrier plates are retracted from the lens window 31 to open the latter, so that the focusing lens 3 is exposed through the lens window 31.

Figure 13:
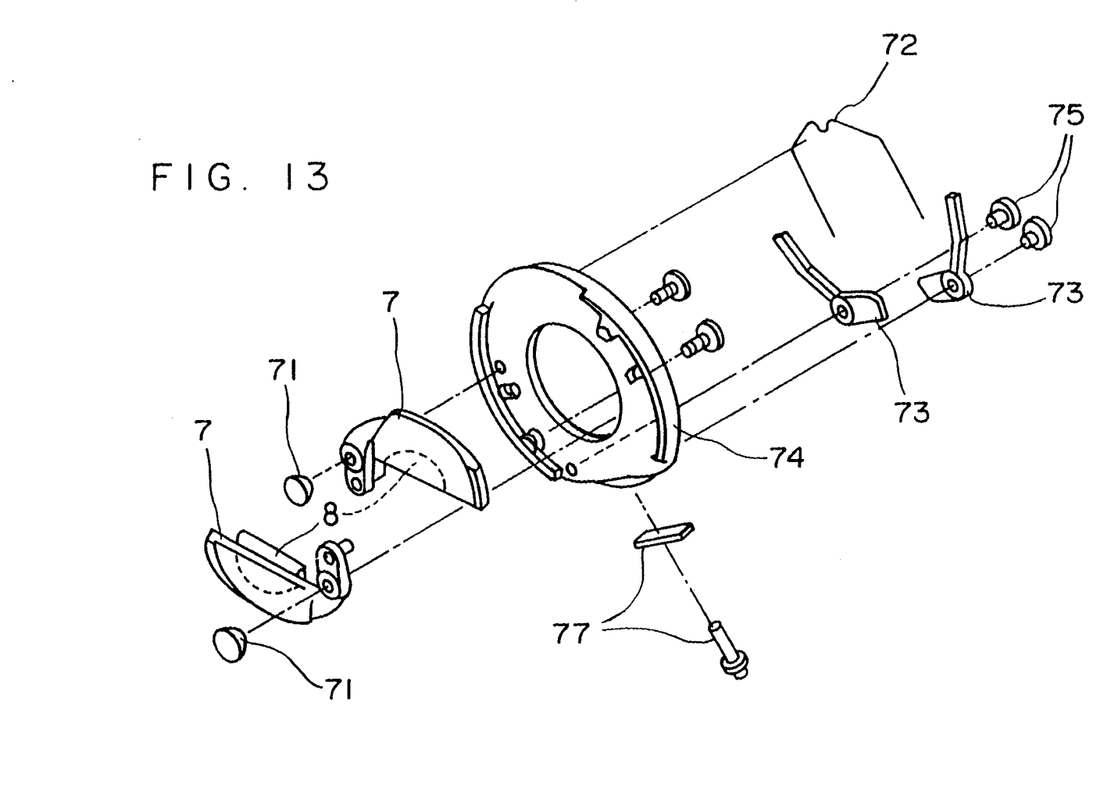
FIG. 13 is an exploded perspective view of a lens barrier actuating device, according to a third embodiment of the present invention.
Figure 14:
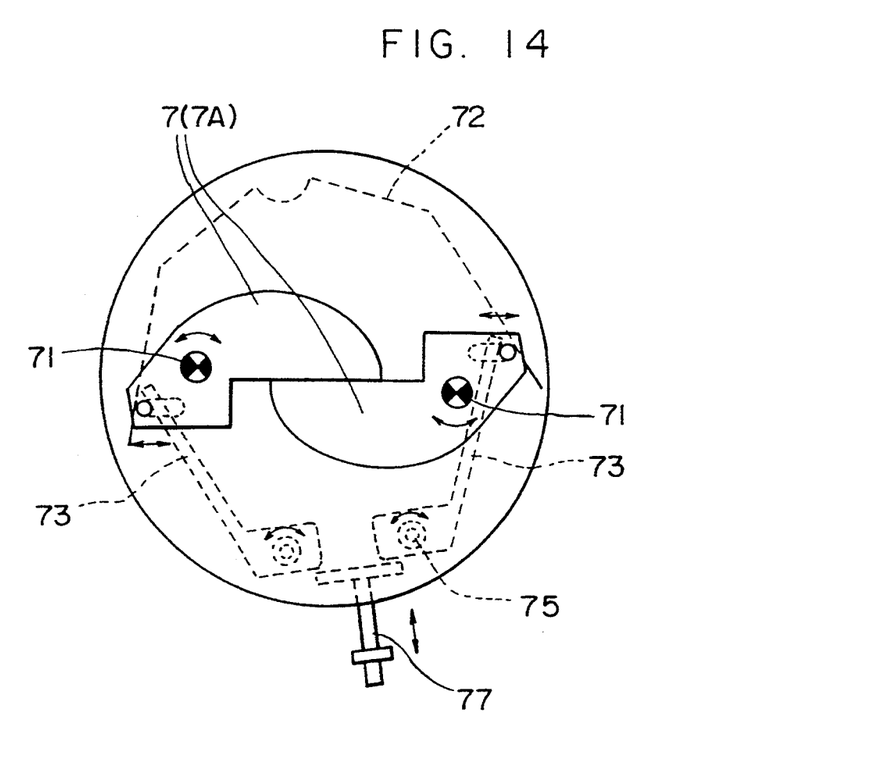
FIG. 14 is a front elevational view of a lens barrier actuating device shown in FIG. 13; and, FIG. 15 is a side elevational view of a lens barrier actuating device shown in FIG. 13.
Figure 15:
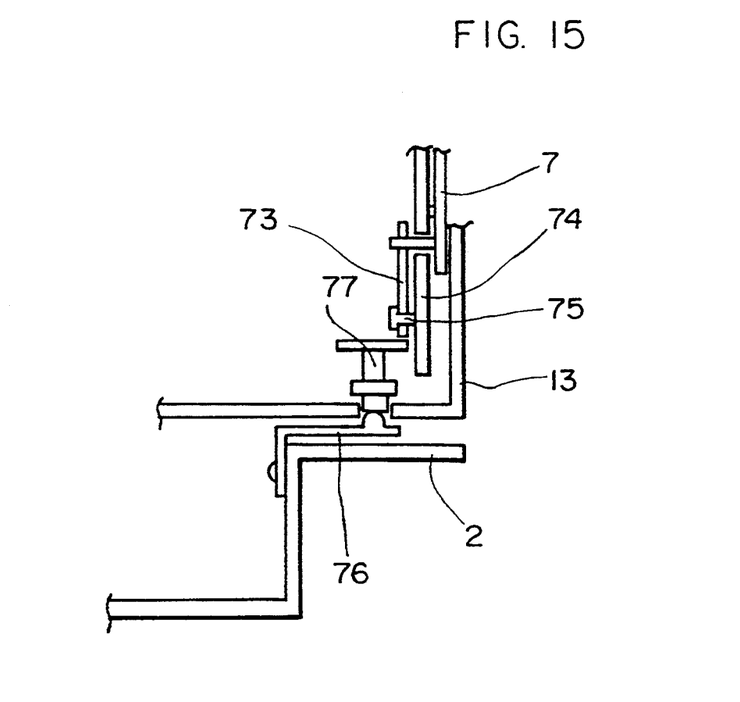

FIGS. 13 through 15 show a lens barrier actuating device. The barrier plates 7 are biased to open the lens window 31 by a spring 72 through a pair of levers 73 which are pivoted about pins 75 connected to a lens housing member 74. The levers 73 are biased by a spring 76, stronger than spring 72, through pushing member 77 when the lens housing 13 is retracted so that the barrier plates close the lens window 31.

Figure 5:
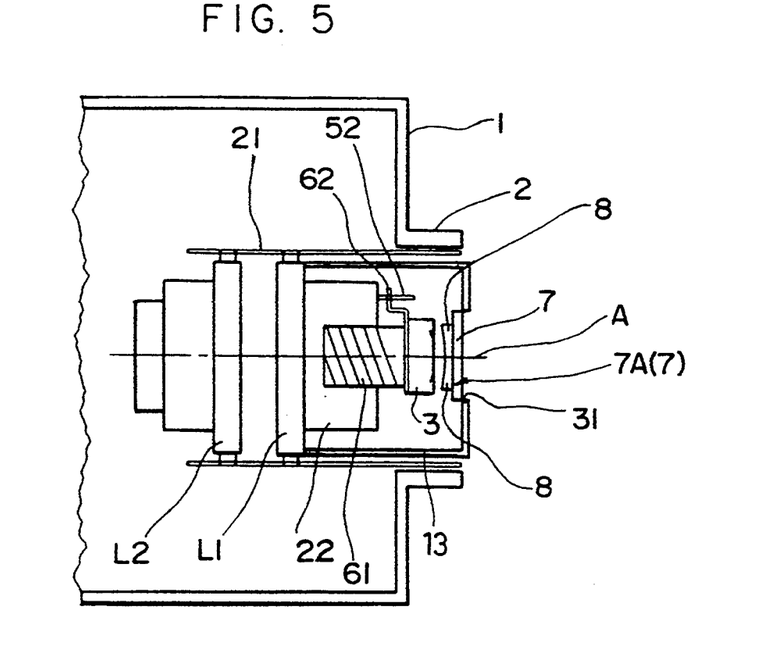
FIG. 5 is a side sectional view of a lens cover of a camera shown in a closed position, according to a third embodiment of the present invention.

Cam 21 is rotated by a main switch and a zoom switch (both not shown). When the main switch is turned OFF, the cam ring 21 is rotated to move the variable power lens groups L1 and L2 to the retracted position, as shown in FIG. 5. At the same time, the drive pin 52 of the shutter unit 22 is rotated in a direction that retracts the focusing lens 3. When the main switch is turned ON, the cam ring 21 moves the variable lens groups L1 and L2 to the shortest focal length position (wide-angle extremity), as shown in FIG. 7. The barrier plates 7 are moved to the open position from the closed position during the movement of the lens groups from the retracted position to the shortest focal length position. The zoom switch is actuated to move the variable power lens groups L1 and L2 between the shortest focal length position and the longest focal length position (telephoto extremity).

Figure 6:
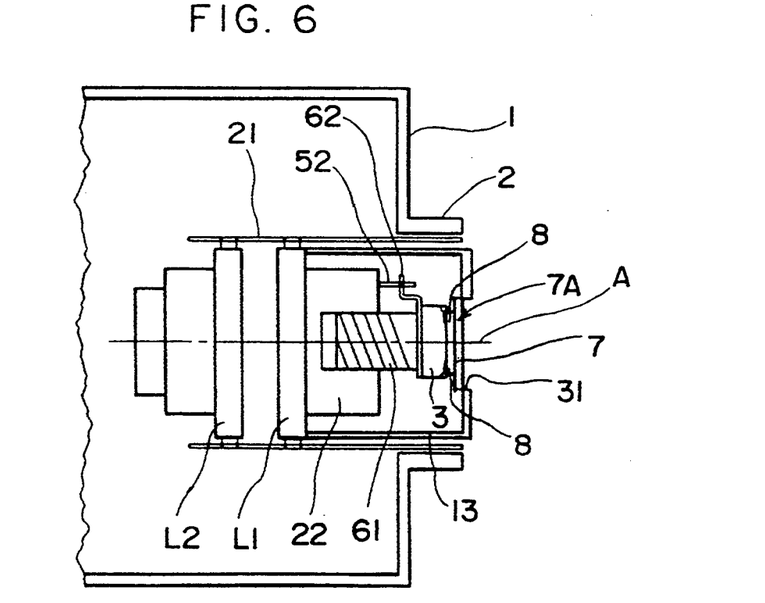
FIG. 6 is a side sectional view of the lens cover shown in FIG. 5 in a different state.

To remove dust, etc., from the lens surface, i.e., to clean the lens surface, the focusing lens 3 is rotated and advanced in the optical axis direction from the position shown in FIG. 5, in which the barrier plates 7 are closed and the focusing lens 3 is located at the most retracted position on the optical axis A, so that the lens surface of the focusing lens 3 comes into contact with the cleaning members 8, as shown in FIG. 6. Consequently, dust, etc., which has come into contact with the lens surface, is removed by the cleaning members 8. The focusing lens 3 is then returned to the extreme retracted position on the optical axis A to complete the cleaning operation.

Figure 12:
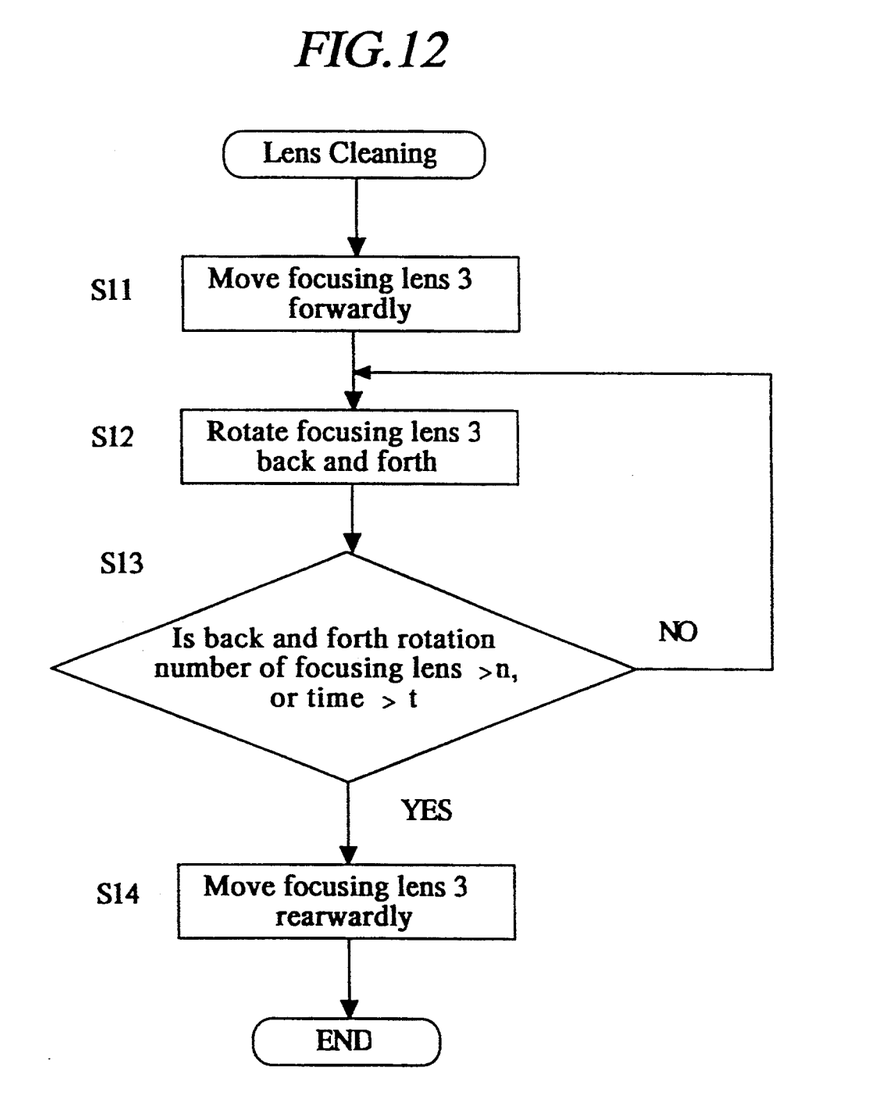
FIG. 12 is a flow chart of control steps of a lens cleaning operation.

FIG. 12 shows an outline of the steps of the lens cleaning operations according to the present invention.

Figure 8:
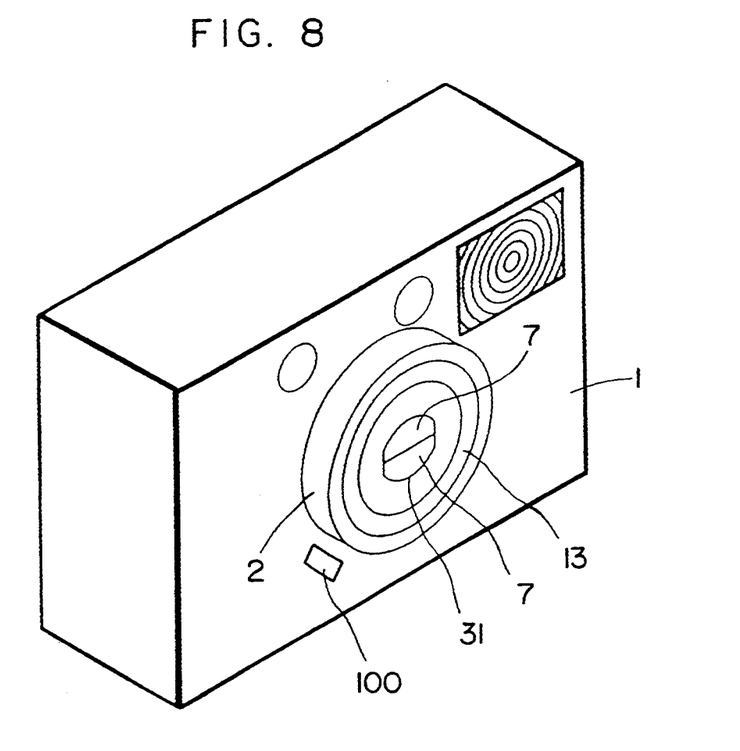
FIG. 8 is a perspective view of a lens cover apparatus of a camera shown in a closed position, according to a third embodiment of the present invention.
Figure 9:
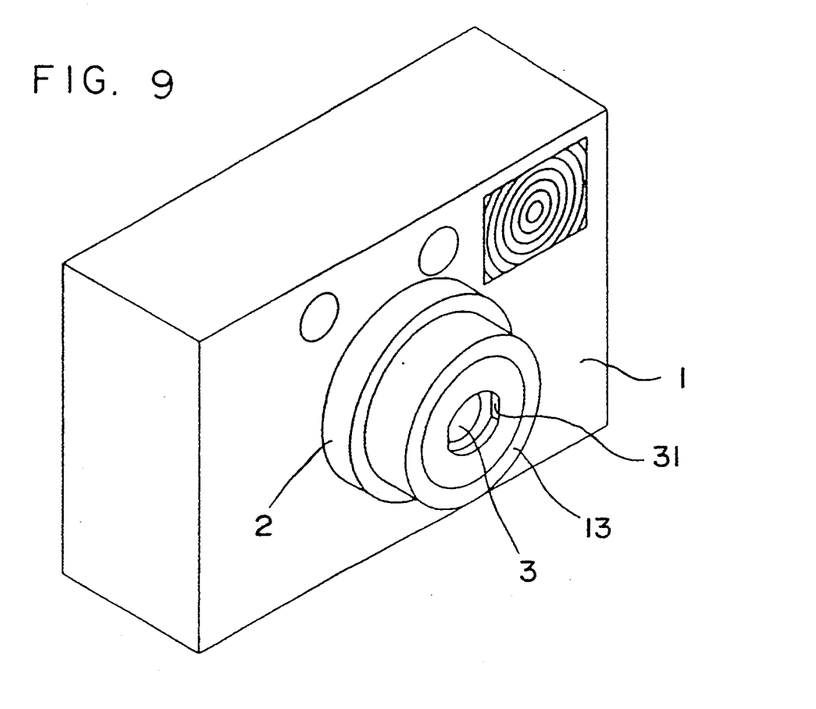
FIG. 9 is a perspective view of a lens cover apparatus of a camera shown in an open position, according to a third embodiment of the present invention.

The lens cleaning program starts when a lens cleaning switch 100 shown in FIG. 8 is actuated. At step S11, the drive pin 52 of the shutter unit 22 is rotated by a predetermined angular displacement in a direction that advances the focusing lens 3 to thereby depress the focusing lens 3 against the cleaning members 8 with a constant pressure. In this state, the barrier plates 7 are maintained in a closed position.

Thereafter, the drive pin 52 is rotated back and forth (i.e., in a reciprocating manner) to rotate the focusing lens 3 in the forward and reverse direct ions at step S12. Due to the reciprocation of the focusing lens 3, the focusing lens 3 is cleaned by the cleaning members 8 which are in slidable contact with the lens surface of the focusing lens 3. Thereafter, the number of times that the direction of rotation of the drive pin 52 has changed or the lapse of time from the commencement of rotation of the drive pin 52 is checked at step S13. If the number or time becomes a predetermined value n (number) or t (time), the lens cleaning operation is stopped. Namely, the drive pin 52 of the shutter unit 22 is rotated in the direction that retracts the focusing lens 3 to complete the cleaning operation, at step S14. This process can also be applied to the first two embodiments.

As can be understood from the above discussion, according to the present invention, the focusing lens 3 can be easily and effectively cleaned by the cleaning members 8 provided on the surface of the barrier plates 7 adjacent to the focusing lens 3, without providing an additional drive source and control means to effect such an operation, for example, prior to the picture taking operation.

It is possible for the cleaning operation to be commenced when the barrier plates 7 are closed by the operation of the barrier actuating switch in order to automatically clean the focusing lens 3, without the use of a special cleaning operation by an operator of the camera 1. This relieves the photographer of having to remember to clean the focusing lens.

In the above-mentioned embodiment, the focusing lens 3 rotates about the optical axis A during the axial movement thereof, but the present invention can be applied to a focusing lens which moves in the optical axis direction without rotating, if the cleaning members 8 are made of a soft deformable material. Namely, the lens can be cleaned by the cleaning members 8 with which the focusing lens comes into contact.

Although the surfaces of the cleaning members 8 adjacent to the focusing lens 3 are concave corresponding to the convex surface of the focusing lens 3 in the illustrated embodiment, the surfaces of the cleaning members 8 can be flat surfaces as long as the cleaning members 8 are made of a deformable material.

I claim:

1. A lens cover apparatus of an optical instrument comprising:
    an optical instrument having a lens;
    a lens cover for covering the lens of the optical instrument;
    a lens cleaning member provided on a surface of the lens cover opposite the lens, wherein said lens cleaning member is supported on said lens cover to be linearly movable, with respect to said lens cover, into and out of contact with the lens and said lens cleaning members disposed to a position so as to be out of contact with the lens, wherein said lens cleaning member is rotatable with respect to said lens cover; and
    biasing means for continuously biasing the lens cleaning member away from the 1, lens when the lens cover is opposite the lens.

2. A lens cover apparatus according to claim 1, wherein said lens cover is detachably mounted to the optical instrument.

3. A lens cover apparatus according to claim 1, wherein said lens having an optical axis, and wherein said lens cover is supported on the optical instrument to slide in a direction perpendicular to the optical axis of the lens.

4. A lens cover apparatus of an optical instrument comprising:
    an optical instrument having a lens;
    a lens cover for covering the lens of the optical instrument; and, a lens cleaning member provided on a surface of the lens cover opposite the lens, wherein said lens cleaning member is supported on said lens cover to be linearly movable, with respect to said lens cover, in to and out of contact with the lens and said lens cleaning members disposed to a position so as to be out of contact with the lens, wherein said lens cleaning member is rotatable with respect to said lens cover; and an actuator on the lens cover for rotating the lens cleaning member.

5. A lens cover apparatus of an optical instrument comprising:

an optical instrument having a lens;

a lens cover for covering the lens of the optical instrument;

a lens cleaning member extensibly provided on a surface of said lens cover which is nearer said lens during covering, wherein said lens cleaning member is supported on said lens cover to be linearly movable, with respect to said lens cover, into and out of contact with the lens; and a biasing element which urges said lens cleaning member to a position out of contact with the lens.

6. A lens cover apparatus according to claim 5, further comprising an element for rotating said lens cleaning member with respect to said lens cover.

7. A lens cover apparatus according to claim 6, wherein said element for rotating said lens cleaning member with respect to said lens cover also linearly moves said lens cleaning member with respect to said lens cover.

8. A lens cover apparatus according to claim 5, wherein said lens cover is detachably mounted to the optical instrument.

9. A lens cover apparatus according to claim 5, wherein said lens cover is supported on the optical instrument to slide in a direction perpendicular to an optical axis of the lens.

10. A lens cover apparatus of an optical instrument comprising;

an optical instrument having a lens;

a lens cover for covering the lens of the optical instrument;

a lens cleaning member extensibly provided on a surface of said lens cover which is nearer said lens during covering, wherein said lens cleaning member is supported on said lens cover to be linearly movable, with respect to said lens cover, into and out of contact with the lens; and an actuator on said lens cover for linearly moving said lens cleaning member into Contact with the lens, wherein actuation of said actuator moves said lens cleaning member linearly with respect to said lens cover.

11. A lens cover apparatus according to claim 1, wherein said actuator comprise an operation plate supported on a surface of said lens cover opposite said surface upon which said lens cleaning member is supported, wherein depression of said operation plate linearly moves said lens cleaning member with respect to said lens cover.

12. A lens cover apparatus according to claim 11, wherein said operation plates rotatable to rotate said lens cleaning member with respect to said lens cover.

13. A lens cover apparatus of an optical instrument comprising:

an optical instrument having a lens;

a lens cover for covering the lens of the optical instrument;

a lens cleaning m ember provided on a surface of the lens cover opposite the lens, wherein said lens cleaning member is supported on said lens cover to be rotatable with respect to said lens cover, further wherein said lens cleaning member is supported on an inner surface of said lens lover to be linearly movable, with respect to said lens cover, into and out of contact with the lens; and a biasing element for biasing said lens cleaning member away from the lens when said lens cover covers the lens.

14. A lens cover apparatus of an optical instrument comprising:

an optical instrument having a lens;

a lens cover for covering the lens of the optical instrument;

a lens cleaning member provided on a surface of the lens cover opposite the lens, wherein said lens cleaning member is supported on said lens cover to be rotatable with respect to said lens cover; and an actuator on said lens cover for rotating said lens cleaning member, wherein rotation of said actuator rotates said lens cleaning member with respect to said lens cover.

15. A lens cover apparatus according to claim 14, wherein said lens cover is detachably mounted to the optical instrument.

16. A lens cover apparatus according to claim 14, wherein said lens cover is supported on the optical instrument to slide in a direction perpendicular to an optical axis of the lens.

17. A lens cover apparatus of an optical instrument comprising:

an optical instrument having a lens;

a lens cover for covering the lens of the optical instrument;

a lens cleaning member provided on a surface of the lens cover opposite the lens, wherein said lens cleaning member is supported on said lens cover to be rotatable with respect to said lens cover, further wherein said lens cleaning member is supported on an inner surface of said lens cover to be linearly movable, with respect to said lens cover, into and out of contact with the lens; and an actuator on said lens cover for linearly moving said lens cleaning member with respect to said lens cover, wherein depression of said actuator linearly moves said lens cleaning member with respect to said lens cover.

18. A lens cover apparatus according to claim 17, wherein said actuator is capable of rotating said lens cleaning member with respect to said cover.

* * * * *

UNITED STATES PATENT AND TRADEMARK OFFICE
CERTIFICATE OF CORRECTION

PATENT NO. : 5,406,413  
DATED : April 11, 1995  
INVENTOR(S) : Makoto MOGAMIYA

Page 1 of 2

It is certified that error appears in the above-indentified patent and that said Letters Patent is hereby corrected as shown below:

At column 6, line 49 (claim 1, line 11), change "members" to ---member is---.

At column 6, line 54 (claim 1, line 16), change "the 1, lens" to ---the lens---.

At column 7, line 5 (claim 4, line 10), change "in to" to ---into---.

At column 7, line 6 (claim 4, line 11), change "members" to ---member is---.

At column 7, line 43 (claim 10, line 2), change ";" to ---:---.

At column 7, line 54 (claim 10, line 13), change "Contact" to ---contact---.

At column 8, line 4 (claim 12, line 2), change "plates" to ---plate is---.

UNITED STATES PATENT AND TRADEMARK OFFICE
CERTIFICATE OF CORRECTION

PATENT NO. : 5,406,413
DATED : April 11, 1995
INVENTOR(S) : Makoto MOGAMIYA

It is certified that error appears in the above-indentified patent and that said Letters Patent is hereby corrected as shown below:

(Cont.)

At column 8, line 11 (claim 13, line 6), change "m ember" to --- member---.

At column 8, line 16 (claim 13, line 11), change "lover" to --- cover---.

At column 8, line 62 (claim 18, line 3), change "said cover" to --- said lens cover---.

Signed and Sealed this

Twelfth Day of December, 1995

Attest:

BRUCE LEHMAN

*Attesting Officer*    Commissioner of Patents and Trademarks